United States Patent
Aad et al.

(10) Patent No.: US 8,165,051 B2
(45) Date of Patent: Apr. 24, 2012

(54) RADIO TERMINAL, RADIO COMMUNICATION SYSTEM, AND RADIO COMMUNICATION METHOD

(75) Inventors: Imad Aad, Munich (DE); Luis Loyola, Tokyo (JP); Joerg Widmer, Munich (DE); Kei Igarashi, Yokohama (JP); Akira Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 443 days.

(21) Appl. No.: 12/424,074

(22) Filed: Apr. 15, 2009

(65) Prior Publication Data

US 2009/0257368 A1    Oct. 15, 2009

(30) Foreign Application Priority Data

Apr. 15, 2008 (JP) ................ P2008-106263

(51) Int. Cl.
*G08C 17/00* (2006.01)
*H04B 7/185* (2006.01)
(52) U.S. Cl. ........................ 370/311; 370/318
(58) Field of Classification Search ............. 370/318, 370/311
See application file for complete search history.

(56) References Cited

U.S. PATENT DOCUMENTS

| 5,657,317 | A  | * | 8/1997  | Mahany et al.    | 370/338 |
| 6,108,316 | A  | * | 8/2000  | Agrawal et al.   | 370/311 |
| 6,804,542 | B1 | * | 10/2004 | Haartsen         | 455/574 |
| 7,181,190 | B2 | * | 2/2007  | Abhishek et al.  | 455/343.4 |
| 7,542,728 | B2 | * | 6/2009  | Bitran et al.    | 455/73 |
| 7,756,548 | B2 | * | 7/2010  | Laroia et al.    | 455/561 |
| 2005/0049013 | A1 | * | 3/2005 | Chang et al.     | 455/574 |
| 2007/0183383 | A1 | * | 8/2007 | Bitran et al.    | 370/338 |
| 2008/0008510 | A1 | * | 1/2008 | Lee et al.       | 399/411 |

FOREIGN PATENT DOCUMENTS

| CN | 1694556 A | 11/2005 |
| JP | 2004-112556 | 4/2004 |

OTHER PUBLICATIONS

IEEE Wireless LAN Edition, "A compilation based on IEEE Std 802.11™-1999 (R2003) and its amendments", 706 pages.
Imad Aad, et al., "E-MAC: Self-Organizing 802.11-Compatible MAC with Elastic Real-time Scheduling", in proceedings of IEEE MASS 2007, 10 pages.

(Continued)

*Primary Examiner* — Jeffrey Pwu
*Assistant Examiner* — Gerald Smarth
(74) *Attorney, Agent, or Firm* — Oblon, Spivak, McClelland, Maier & Neustadt, L.L.P.

(57) ABSTRACT

A radio terminal includes a radio interface configured to allow radio communication with a radio base station, and a controller configured to control switching between a wake-up state in which the radio interface is turned on and a sleep state in which the radio interface is turned off. The radio terminal acquires a reference wake-up timing scheduled as a wake-up timing for switching from the sleep state to the wake-up state. The controller shifts the wake-up timing from the reference wake-up timing.

16 Claims, 10 Drawing Sheets

OTHER PUBLICATIONS

IEEE Standard for Information technology—Telecommunications and information exchange between systems—Local and metropolitan area networks—Specific requirements, Part 11:"Wireless LAN Medium Access Control (MAC) and Physical Layer (PHY) specifications", Amendment 8: "Medium Access Control (MAC) Quality of Service Enhancements", IEEE Std 802.11™-2005, Nov. 11, 2005, 211 pages.

Zhihui Chen, et al., "Self Organization and Energy Efficient TDMA MAC Protocol by Wake UP for Wireless Sensor Networks", IEEE SECON 2004, First Annual IEEE Communication Society Conference, 2004, pp. 335-341.

Alessandro Giusti, et al., "Decentralized Scattering of Wake-up Times in Wireless Sensor Networks", in Proc. of EWSN 2007, 16 pages.

Office Action issued on Apr. 25, 2011 in the corresponding Chinese Application No. 200910132040.0 (with English Translation).

* cited by examiner

RADIO TERMINAL, RADIO COMMUNICATION SYSTEM, AND RADIO COMMUNICATION METHOD

CROSS REFERENCE TO RELATED APPLICATIONS

This application is based upon and claims the benefit of priority from prior Japanese Patent Application No. 2008-106268, filed on Apr. 15, 2008; the entire contents of which are incorporated herein by reference.

BACKGROUND OF THE INVENTION

1. Field of the Invention

The present invention relates to a radio terminal, a radio communication system, and a radio communication method. Specifically, the radio communication system includes a base station and a plurality of radio terminals and allowing radio communication to be performed by using a predetermined radio band, and the plurality of radio terminals each having a radio interface for performing radio communication with the base station.

2. Description of the Related Art

Conventionally, a radio communication scheme using carrier sense multiple access with collision avoidance (CSMA/CA) has been known to be employed in a radio network including a base station and a plurality of radio terminals.

In general, the order in which the radio terminals transmit their packets is determined randomly. Alternatively, the order in which the radio terminals transmit packets is determined by scheduling in the radio network. In scheduling, time (slot) during which a radio terminal transmits a packet is determined for each of the radio terminals. This reduces collision probability of packets transmitted by the radio terminals, allowing radio resources to be effectively used.

The following techniques have been proposed as a technique for the radio communication scheme using CSMA/CA.

In a first technique, distributed coordination function (DCF) is defined as a communication protocol for a wireless LAN (see, for example, IEEE Standard 802.11, 1999 (R2003) and its amendments, IEEE Press). DCF is a protocol for allowing radio terminals to autonomously and distributedly determine their timings to transmit packets.

In a second technique, enhanced distributed coordination access (EDCA) is defined as a communication scheme using quality of service (QoS) on the basis of DCF (see, for example, I. Aad, P. Hofmann, L. Loyola, J. Wdmer, "Self-organizing 802.11-compatible MAC with Elastic Real-time Scheduling," in proceedings of IEEE MASS 2007, October 2007, Pisa, Italy).

In a third technique, the scheduling is performed by a representative one of the plurality of radio terminals (see, for example, IEEE Standard 802.11e, 2005). Specifically, in the third technique, a communication protocol further enhanced based on IEEE 802.11e used in the second technique is proposed. In the third technique, the representative radio terminal performs scheduling of a packet transmission order in a real-time application. The representative radio terminal transmits a packet for notification of the packet transmission order. Each of the radio terminals monitors the packet for notification of the packet transmission order.

Meanwhile, a radio terminal having a power-saving mode to reduce its electric power consumption is known. In the power saving mode, the electric power consumed by the radio terminal is reduced by performing switching from a wake-up state to a sleep state. In the wake-up state, packets can be transmitted and received. In the sleep state, a radio interface in the radio terminal is turned off.

The following techniques have been proposed as a technique for reducing the electric power consumed by the radio terminal.

In a fourth technique, the radio terminal estimates a timing at which a packet will be transmitted or received (called a transmission/reception timing below), and switches from the sleep state to the wake-up state at the transmission reception timing thus estimated (see, for example, U.S. Pat. No. 7,181,190 "Method for maintaining wireless network response time while saving wireless adapter power").

In a fifth technique, a MAC protocol based on time division multiple access (TDMA) is proposed. Specifically, the radio interface in the radio terminal is turned off in slots other than the slot used to transmit or receive packets. (See, for example, Zhihui Chen and Ashfaq Khokhar, "Self Organization and Energy Efficient TDMA MAC," 2004 First Annual IEEE Communications Society Conference on Sensor and Ad Hoc Communications and Networks, 2004. IEEE SECON 2004.)

In a sixth technique, each of the radio terminals monitors a period in which a different radio terminal transmits or receives packets (called a packet transmission/reception period below). Thereby, timings of switching from the sleep-state to the wake-up state are scattered, and accordingly delay is prevented. (See, for example, Alessandro Giusti, Amy L. Murphy, and Gian Pietro Picco, "Decentralized Scattering of Wake-up Times in Wireless Sensor Networks," in Proc. of EWSN 2007.)

With the above techniques, however, it is difficult to accomplish both of effective use of the radio resources and reduction in electric power consumption. Specifically, as mentioned above, the radio terminal turns off the radio interface in the sleep state. As a result, the radio terminal in the sleep state cannot monitor the packet for notification of the packet transmission order. Likewise, the radio terminal in the sleep state cannot monitor the packet transmission/reception period of a different radio terminal.

To be more specific, in point coordinating function (PCF) according to the first and second techniques, timings to perform polling are not defined exactly. Consequently, the radio terminal cannot switch to the sleep state in a time period between the start of a period controlled by PCF (a contention free period (CFP)) and the completion of transmission or reception of packets.

In the third technique, the radio terminal in the sleep state cannot monitor the packet for notification of the packet transmission order.

In the fourth to sixth techniques, the radio terminal in the sleep state cannot discover completion of radio communication of a different terminal. This might lead to a case where the radio resources are not effectively used.

SUMMARY OF THE INVENTION

A radio terminal according to a first aspect of the present invention is in a radio communication system including a radio base station and a plurality of radio terminals and allowing to perform radio communication by using a predetermined radio band, the radio terminal being any one of the plurality of radio terminals. The radio terminal includes: a radio interface configured to allow radio communication with the radio base station; a controller configured to control switching between a wake-up state in which the radio interface is turned on and a sleep state in which the radio interface is turned off; and an acquiring unit configured to acquire a reference wake-up timing scheduled as a wake-up timing for switching from the sleep state to the wake-up state. The controller shifts the wake-up timing from the reference wake-up timing.

According to the above aspect, the controller shifts the wake-up timing from the reference wake-up timing, This means that the period in which the radio terminal is in the wake-up state is shifted from the scheduled timing. Accordingly, a period emptied after a different radio terminal ends its radio communication can be effectively used. Furthermore, since the reference wake-up timing is previously scheduled, wasteful consumption of electric power can be prevented.

In the first aspect, the acquiring unit acquires the reference wake-up timing from the radio base station.

In the first aspect, the acquiring unit acquires the reference wake-up timing from a representative radio terminal being any one of the plurality of radio terminals.

In the first aspect, the acquiring unit autonomously acquires the reference wake-up timing in an own radio terminal.

In the first aspect, the reference wake-up timing is determined based on a usage state of the predetermined radio band.

In the first aspect, the reference wake-up timing is determined based on a length of time used for radio communication.

In the first aspect, the radio terminal further includes a monitor configured to monitor a usage state of the predetermined radio band in the wake-up state. The controller shifts the wake-up timing from the reference wake-up timing, based on the usage state of the predetermined radio band.

In the first aspect, the controller shifts the wake-up timing from the reference wake-up timing, based on QoS information set for the radio communication performed by an own radio terminal.

In the first aspect, the controller shifts the wake-up timing from the reference wake-up timing, based on an error rate of the radio communication performed by an own radio terminal.

In the first aspect, the radio terminal further includes a battery configured to accumulate electric power to be supplied to the radio interface. The controller shifts the wake-up timing from the reference wake-up timing, based on a remaining amount of electric power accumulated in the battery.

In the first aspect, the controller controls a shift amount by which the wake-up timing is shifted from the reference wake-up timing. The controller controls the shift amount of a next shift, based on the shift amount of a current shift.

In the first aspect, an upper limit is defined for a shift amount by which the wake-up timing is shifted from the reference wake-up timing. The controller shifts the wake-up timing from the reference wake-up timing without exceeding the upper limit for the shift amount.

In the first aspect, the controller shifts the wake-up timing which is previously shifted from the reference timing, back to the reference wake-up timing, when the predetermined radio band at the wake-up timing previously shifted is occupied by a different radio terminal.

In the first aspect, the controller shifts the wake-up timing from the reference wake-up timing when a different radio terminal performing radio communication immediately before an own radio terminal has shifted the wake-up timing from the reference wake-up timing.

A radio communication system according to a second aspect of the present invention includes a radio base station and a plurality of radio terminals each having a radio interface and performing radio communication with the radio base station, and allows radio communication to be performed by using a predetermined radio band. The radio communication system includes: a controller configured to control switching between a wake-up state in which the radio interface is turned on and a sleep-state in which the radio interface is turned off; and a setter configured to set a reference wake-up timing scheduled as a wake-up timing for switching from the sleep state to the wake-up state. The controller shifts the wake-up timing from the reference wake-up timing.

A radio communication method according to a third aspect of the present invention performs radio communication by using a predetermined radio band in a radio communication system including a radio base station and a plurality of radio terminals each having a radio interface configured to allow radio communication with the radio base station. The radio communication method including the steps of: (a) controlling switching between a wake-up state in which the radio interface is turned on and a sleep-state in which the radio interface is turned off; (b) setting a reference wake-up timing scheduled as a wake-up timing for switching from the sleep state to the wake-up state; and (c) shifting the wake-up timing from the reference wake-up timing.

DESCRIPTION OF THE PREFERRED EMBODIMENTS

With reference to the drawings, descriptions will be given below of radio communication systems according to embodiments of the present invention. Note that the same or similar parts bear the same or similar reference numerals throughout the drawings.

It should be noted that the drawings are schematic, and therefore dimensional proportions or the like in the drawings are different from actual values. Accordingly, specific dimensions and others should be inferred based on the description given below. Moreover, dimensional relationships and dimensional proportions are different from one drawing to another in some parts, of course.

First Embodiment

Configuration of Radio Communication System

Figure 1:
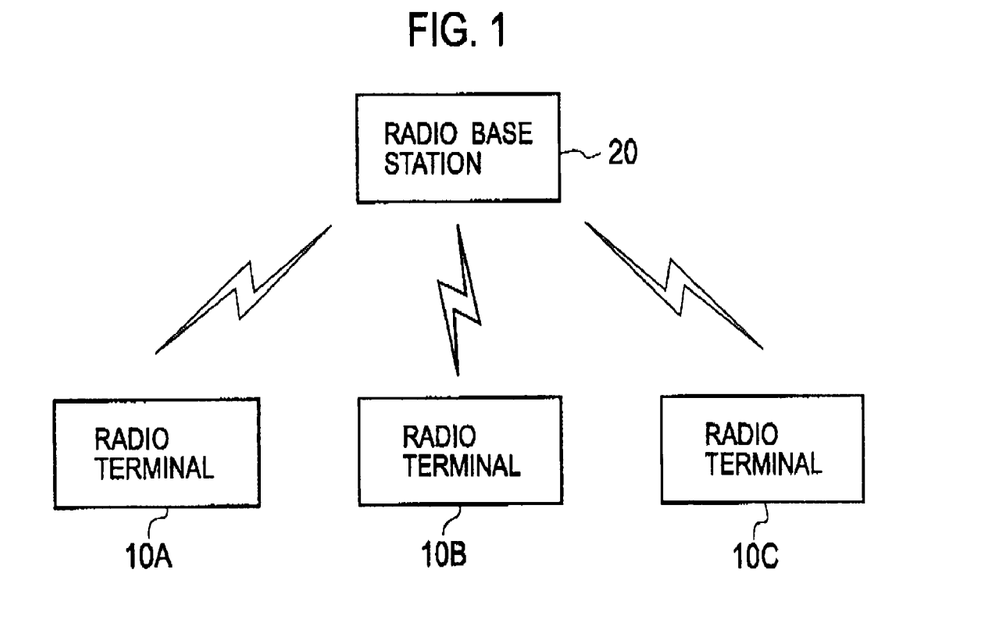
FIG. 1 is a diagram showing a radio communication system according to a first embodiment.

With reference to the drawing, a description will be given below of the configuration of a radio communication system according to a first embodiment. FIG. 1 is a diagram illustrating the radio communication system according to the first embodiment.

As illustrated in FIG. 1, the radio communication system includes a plurality of radio terminals 10 (radio terminals 10A to 10G) and a radio base station 20. In the radio communication system, radio communication is performed using a predetermined radio band. Of course, there can be any number of the radio terminals 10.

The radio communication system is, for example, a wireless LAN communication system or the like. The radio communication system employs a radio communication scheme using, for example, carrier sense multiple access with collision avoidance (CSMA/CA).

The radio terminal 10 is a terminal constituting of a CPU, a ROM, a RAM, and others. The radio terminal 10 is a mobile terminal, a PDA, or the like, and has a function of performing radio communication with the radio base station 20.

The radio base station 20 is a device constituting of a CPU, a ROM, a RAM, and others. The radio base station 20 has a function of performing radio communication with the radio terminal 10.

(Configuration of Radio Terminal)

Figure 2:
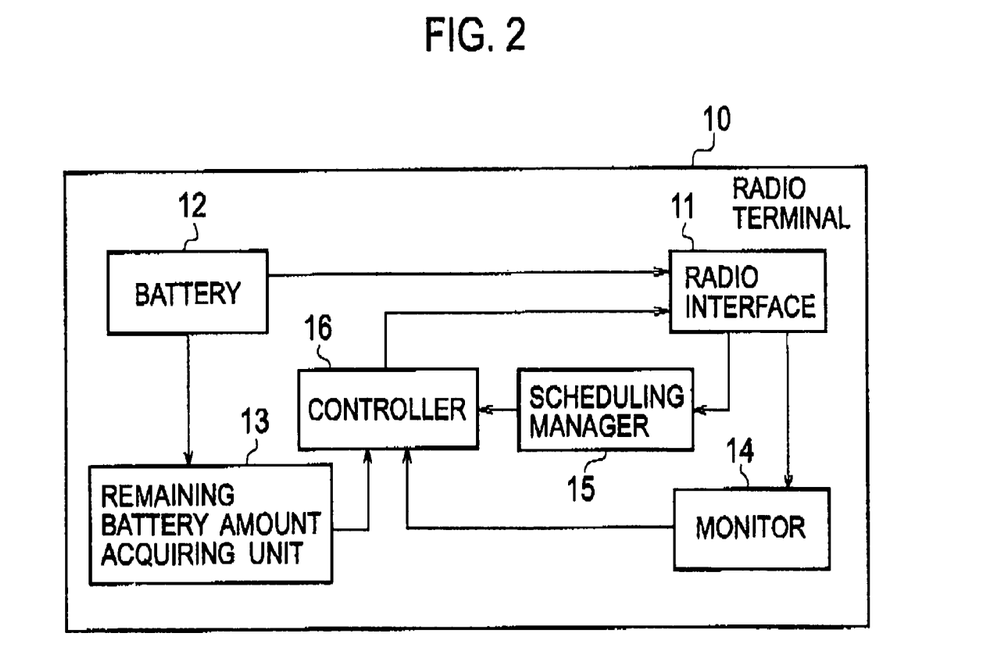
FIG. 2 is a block diagram showing a radio terminal according to the first embodiment.

With reference to the drawing, a description will be given below of the configuration of the radio terminal according to the first embodiment. FIG. 2 is a block diagram illustrating the radio terminal 10 according to the first embodiment.

As shown in FIG. 2, the radio terminal 10 includes a radio interface 11, a battery 12, a remaining battery amount acquiring unit 13, a monitor 14, a scheduling manager 15, and a controller 16.

The radio interface 11 performs radio communication with the radio base station 20. Specifically, the radio interface 11 performs operation such as transmission and reception of radio waves. Radio waves received by the radio interface 11 include radio waves for not only for its own radio terminal 10, but also for other radio terminals 10.

States of the radio interface 11 include a wake-up state and a sleep state. In the wake-up state, the radio interface 11 is turned on. In the sleep state, the radio interface 11 is turned off.

For example, the radio interface 11 transmits a packet including remaining battery amount data, which is described later, to the radio base station 20. Further, the radio interface 11 transmits a packet including user data to the radio base station 20. The radio interface 11 may transmit a packet including both of the remaining battery amount data and the user data to the radio base station 20.

The radio interface 11 receives a packet including scheduling information from the radio base station 20. Further, the radio interface 11 receives a packet including user data from the radio base station. The radio interface 11 may receive a packet including both of the scheduling data and the user data from the radio base station 20.

Note that the scheduling information includes a reference timing at which its own radio terminal 10 performs communication. For example, the scheduling information includes a reference timing of a slot assigned to its own radio terminal 10.

Switching from the sleep state to the wake-up state is performed basically at a start timing of a slot assigned to its own radio terminal 10. On the other hand, switching from the wake-up state to the sleep state is performed basically at an end timing of the slot assigned to its own radio terminal 10.

Accordingly, it can be considered that the scheduling information includes a reference wake-up timing scheduled as a wake-up timing for switching from the sleep state to the wake-up state. Likewise, it can be considered that the scheduling information includes a reference sleep timing scheduled as a sleep timing for switching from the wake-up state to the sleep state.

The battery 12 accumulates electric power to be supplied to the radio interface 11. The battery 12 is, for example, a secondary battery such as a lithium-ion battery.

The remaining battery amount acquiring unit 13 acquires a remaining amount of electric power accumulated in the battery 12 (such an amount is called a remaining battery amount below). The remaining battery amount acquiring unit 13 may quantize the remaining battery amount into values in a predetermined range (e.g., integers from 1 to 4).

The monitor 14 monitors the usage state of the predetermined radio band. Specifically, the monitor 14 acquires the usage state of the predetermined radio band by monitoring radio waves (particularly for other radio terminals 10) received by the radio interface 11. Accordingly, the monitor 14 monitors the usage state of the predetermined radio band in the wake-up state.

The scheduling manager 15 manages the scheduling information received from the radio base station 20. Specifically, the scheduling manager 15 manages at least the reference timing at which its own radio terminal 10 performs radio communication. Accordingly, it can be considered that the scheduling manager 15 manages the reference wake-up timing.

The controller 16 controls the overall operation of the radio terminal 10. For example, the controller 16 performs operations such as setting a radio parameter used in the radio communication. Further, the controller 16 instructs the radio interface 11 to transmit remaining battery data indicating an amount of remaining battery and user data.

The controller 16 controls switching between the sleep state and the wake-up state, based on the scheduling information managed by the scheduling manager 15. Basically, the controller 16 performs switching from the sleep state to the wake-up state at the start timing (i.e., reference wake-up timing) of the slot assigned to its own terminal 10. The controller 16 performs switching from the wake-up state to the sleep state at the end timing (i.e., reference sleep timing) of the slot assigned to its own terminal 10.

At this time, the controller 16 shifts the wake-up timing for switching from the sleep state to the wake-up state from the reference wake-up timing. Along with this, the sleep timing for switching from the wake-up state to the sleep state may be shifted from the reference sleep timing.

The wake-up timing shift may be a time shift to before or after the reference wake-up timing. Likewise, the sleep timing shift may be a time shift to before or after the reference sleep timing.

For example, the controller 16 may shift the wake-up timing from the reference wake-up timing, based on the usage state of the predetermined radio band. Specifically, the controller 16 shifts the wake-up timing from the reference wake-up timing when the usage rate of the predetermined radio band is lower than a predetermined usage rate.

For example, the controller 16 may shift the wake-up timing from the reference wake-up timing, based on QoS information. The QoS information is set according to the radio communication (i.e., the application performing the radio communication). The QoS information indicates quality required in the radio communication (the application performing the radio communication). Specifically, the controller 16 shifts the wake-up timing from the reference wake-up timing when the quality indicated by the QoS information is higher than a predetermined quality.

For example, the controller 16 may shift the wake-up timing from the reference wake-up timing, based on an error rate of the radio communication performed by its own radio terminal 10 (e.g., packet error rate (PER)). Specifically, the controller 16 shifts the wake-up timing from the reference wake-up timing when the error rate is lower than a predetermined error rate.

For example, the controller 16 may shift the wake-up timing from the reference wake-up timing, based on the amount of remaining battery accumulated in the battery 12 in its own radio terminal 10. Specifically, the controller 16 shifts the wake-up timing from the reference wake-up timing when the remaining battery amount is higher than a predetermined remaining battery amount.

Preferably, the controller 16 determines the next wake-up timing when performing switching from the wake-up state to the sleep state. In other words, the controller 16 determines whether to shift the wake-up timing from the reference wake-up timing when performing switching from the wake-up state to the sleep state.

Preferably, the controller 16 controls the amount by which the wake-up timing is shifted from the reference wake-up timing (called a shift amount below) for the next time, based on the current shift amount. Consider here a case where the shift amount is expressed as $T_{PREV}(n)$ where the number of shifts is n.

For example, the next shift amount $T_{PREV}(n+1)$ is calculated by $T_{PREV}(n+1)=C \times T_{PREV}(n)$. Note that C is a constant (such as 2, for example). In such a case, when the number of shifts increases, the shift amount increases according to an exponential function taking $C^{n-1}$ as a coefficient.

Alternatively, the next shift amount $T_{PREV}(n+1)$ may be calculated by $T_{PREV}(n+1)=F+T_{PREV}(n)$. Note that F is an increase amount of the shift amount. In such a case, when the number of shifts increases, the shift amount increases according to a proportional function taking F×n as a coefficient.

Preferably, an upper limit for the shift amount is defined. To be more precise, it is more preferable to define an upper limit for the amount of shift to before the reference wake-up timing in terms of time and an upper limit for the amount of shift to after the reference wake-up timing in terms of time. The controller 16 shifts the wake-up timing from the reference wake-up timing without exceeding the upper limit for the shift amount.

Preferably, the controller 16 shifts the wake-up timing from the reference wake-up timing when a different radio terminal 10 performing radio communication immediately before its own radio terminal 10 has shifted the wake-up timing from the reference wake-up timing.

Preferably, when having shifted the wake-up timing from the reference wake-up timing and discovering that the wake-up timing in the predetermined radio band is occupied by a different radio terminal 10 at the wake-up timing, the controller 16 returns the wake-up timing which has been shifted from the reference wake-up timing back to the reference wake-up timing.

(Configuration of Radio Base Station)

Figure 3:
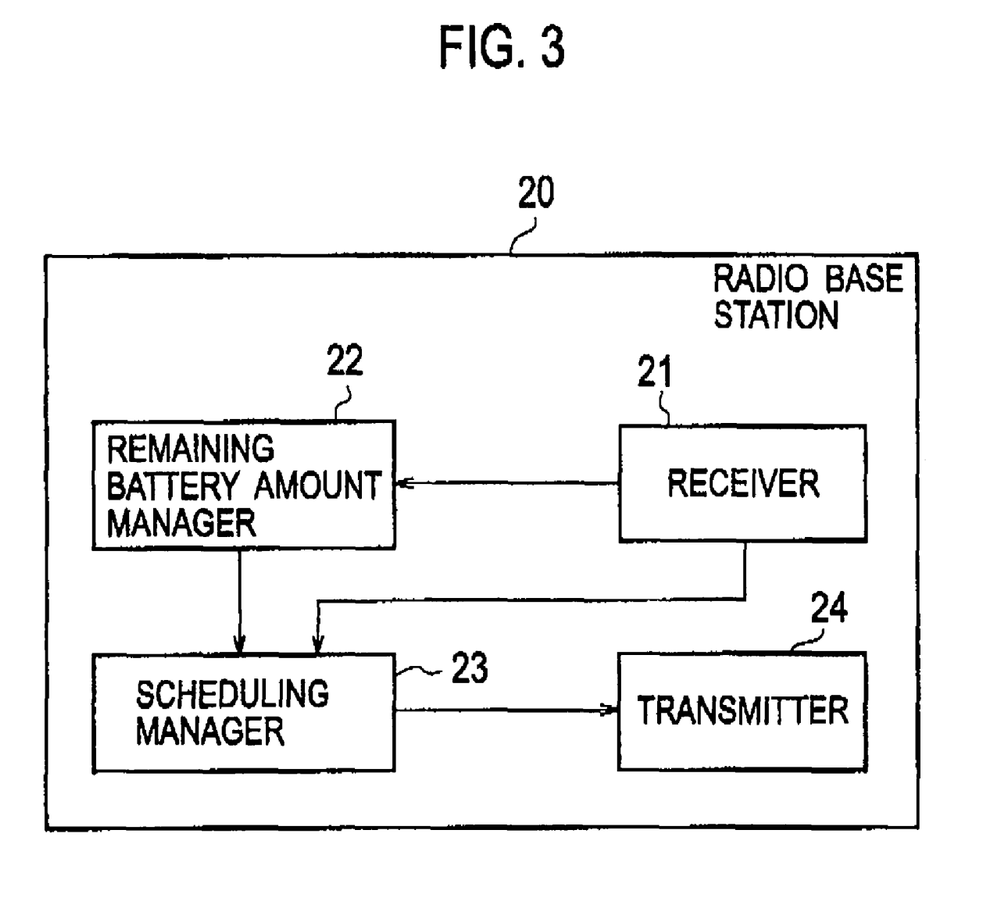
FIG. 3 is a block diagram showing a radio base station according to the first embodiment.

With reference to the drawing, a description will be given below of the configuration of the radio base station according to the first embodiment. FIG. 3 is a diagram showing the radio base station 20 according to the first embodiment.

As shown in FIG. 3, the radio base station 20 includes a receiver 21, a remaining battery amount manager 22, a scheduling manager 23, and a transmitter 24.

The receiver 21 receives radio waves from each of the radio terminals 10. Specifically, the receiver 21 receives packets from each of the radio terminals 10. Packets received from each radio terminal 10 include a packet including remaining battery amount data, a packet including user data, a packet including both of the remaining battery amount data and user data, and the like.

Based on the remaining battery amount data received, the remaining battery amount manager 22 manages the remaining battery amount of each of the radio terminals 10.

The scheduling manager 23 determines the reference timing for each of the radio terminals 10 for performing radio communication. For example, what the scheduling manager 23 determines is a reference timing of a time slot assigned to each of the radio terminals 10.

Here, it can be considered that, for each of the radio terminals, the scheduling manager 23 determines the reference wake-up timing scheduled as the wake-up timing for switching from the sleep state to the wake-up state. Likewise, it can be considered that, for each of the radio terminals, the scheduling manager 23 determines the reference sleep timing scheduled as the sleep timing for switching from the wake-up state to the sleep state.

Further, the scheduling manager 23 manages the reference timings of the respective radio terminals 10 for performing radio communication. Moreover, the scheduling manager 23 generates scheduling information indicating the reference timings of the respective radio terminals 10 for performing radio communication.

For example, the scheduling manager 23 may acquire the usage state of the predetermined radio band, based on the radio waves received by the receiver 21, and determine the reference timings (the reference wake-up timing and the reference sleep timing) of the respective radio terminals 10 for performing radio communication, based on that usage state of the predetermined radio band thus acquired.

For example, the scheduling manager 23 may determine the reference timings (the reference wake-up timing and the reference sleep timing) of the respective radio terminals 10 for performing radio communication, based on lengths of time used by the respective radio terminals 10 for radio communication. The length of time used by a certain radio terminal 10 for radio communication is defined according to an amount of data to be transmitted to that radio terminal 10 and an amount of data to be received from that radio terminal 10.

For example, the scheduling manager 23 may determine the reference timings (the reference wake-up timing and the reference sleep timing) of the respective radio terminals 10 for performing radio communication, based on the remaining battery amounts of the respective radio terminals 10.

The transmitter 24 transmits radio waves to each of the radio terminals 10. Specifically, the transmitter 24 transmits packets to each of the radio terminals 10. The packets transmitted to the radio terminals 10 include a packet including scheduling information, a packet including user data, a packet including both of the scheduling information and the user data, and the like.

(Wake-Up Timing Shift)

With reference to the drawings, a description will be given below of wake-up timing shift according to the first embodiment. FIGS. 4A and 4B, 5A and 5B, 6A and 6B, as well as 7A and 7B are diagrams showing the wake-up timing shift according to the first embodiment. In the following, Slot A is a time slot assigned to the radio terminal 10A. Likewise, Slot B is a time slot assigned to the radio terminal 10B, and Slot C is a time slot assigned to the radio terminal 10C.

Figure 4A:
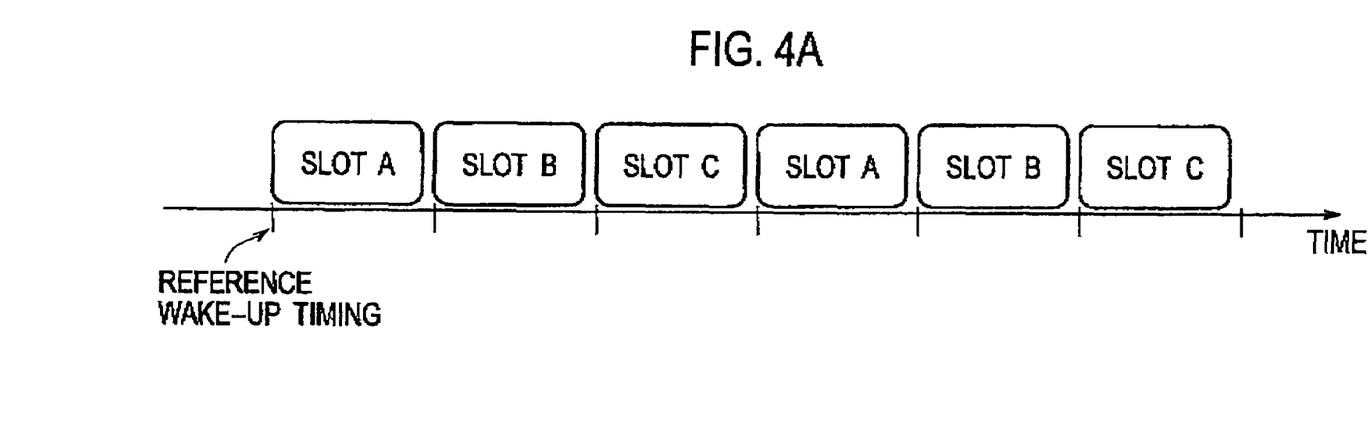
FIGS. 4A and 4B are diagrams illustrating a wake-up timing shift according to the firs embodiment.

Firstly, referring to FIGS. 4A and 4B, a description is given of a case where the wake-up timing is not shifted. As shown in FIG. 4A, the start timings of Slots A to C are exactly at their reference wake-up timings. The radio terminals 10 are in the wake-up state at the time slots assigned to their own radio terminals 10. On the other hand, the radio terminals 10 are in the sleep state at the time slots not assigned to their own radio terminals 10.

Figure 4B:
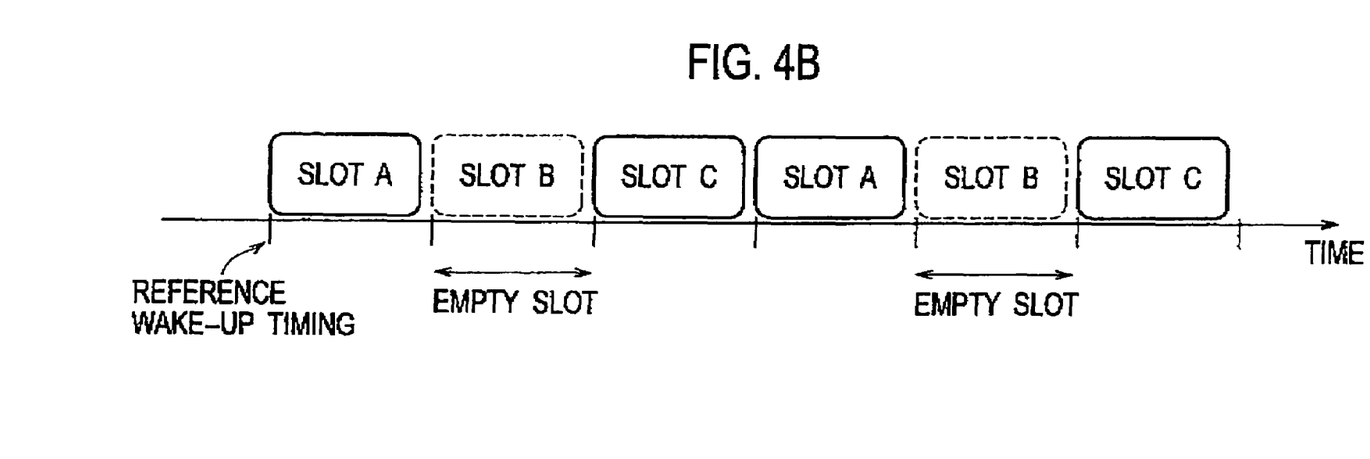

As shown in FIG. 4B, Slot B becomes an empty slot once the radio terminal 10B finishes its radio communication. However, the radio terminals 10A and 10C are in the sleep state during Slot B, so that they cannot discover the existence of an empty slot.

Figure 5A:
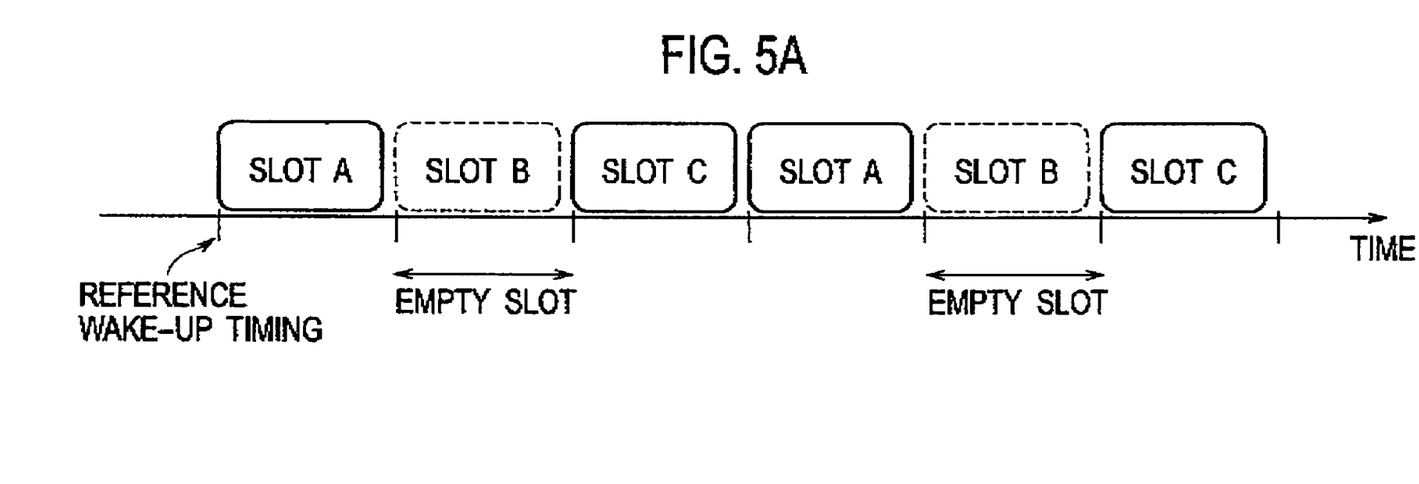
FIGS. 5A and 5B are diagrams illustrating the wake-up timing shift according to the firs embodiment.
Figure 5B:
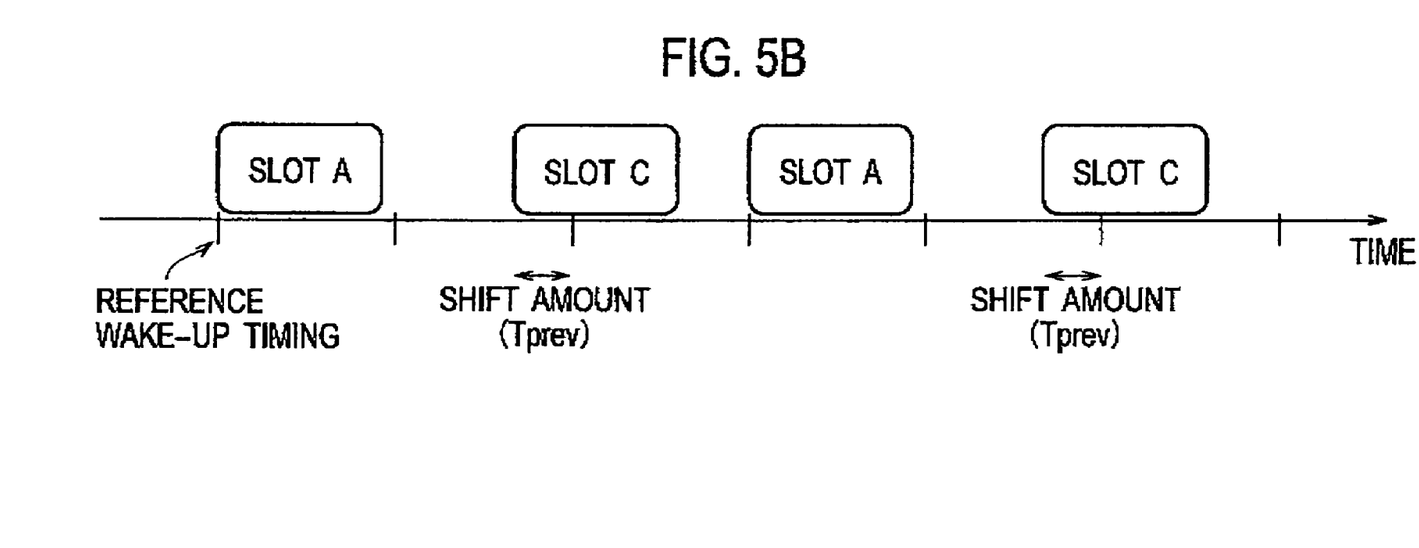

Secondly, referring to FIGS. 5A and 5B, a description is given of a case where the radio terminal 10C shifts its wake-up timing, FIG. 5A is the same as FIG. 4B described above.

As shown in FIG. 5B, the radio terminal 10C makes a time shift of the wake-up timing to before the reference wake-up timing. Note that the shift amount is "$T_{PREV}$". By this wake-up timing shift, a period emptied after the radio terminal 10B ends its radio communication is effectively used.

Figure 6A:
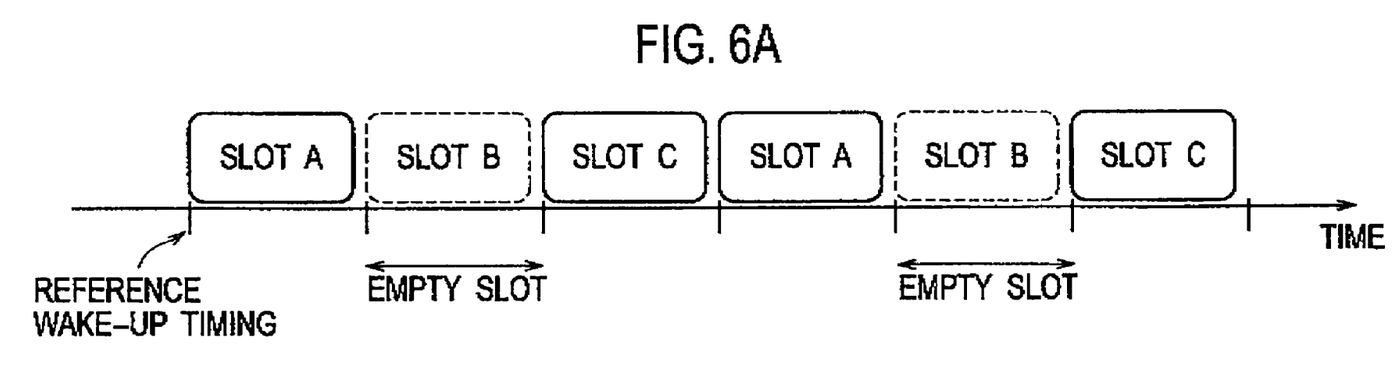
FIGS. 6A and 6B are diagrams illustrating the wake-up timing shift according to the firs embodiment.
Figure 6B:
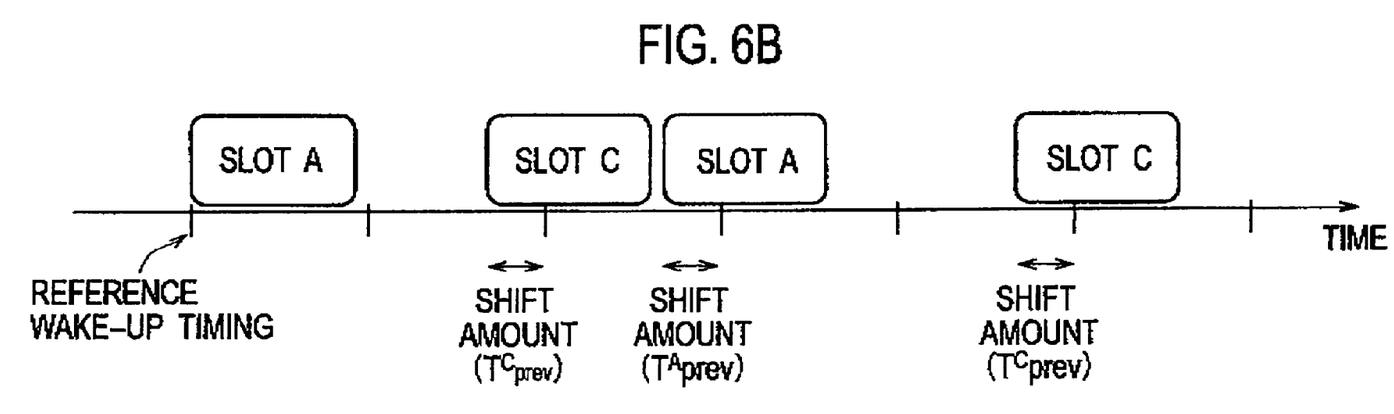

Thirdly, referring to FIGS. 6A and 6B, a description is given of a case where the radio terminals 10C and 10A shift their wake-up timings, FIG. 6A is the same as FIG. 4B described above.

As shown in FIG. 6B, the radio terminal 10C makes a time shift of the wake-up timing to before the reference wake-up timing. Note that the shift amount is "$T^C_{PREV}$". By this wake-up timing shift, the radio terminal 10C can discover that the Slot B is an empty slot. Accordingly, a period emptied after the radio terminal 10B ends its radio communication is effectively used.

In addition to the above, the radio terminal 10A makes a time shift of its wake-up timing to before the reference wake-up timing. Note that the shift amount is "$T^A_{PREV}$". By this wake-up timing shift, a period emptied after the radio terminal 10C ends its radio communication is effectively used.

Figure 7A:
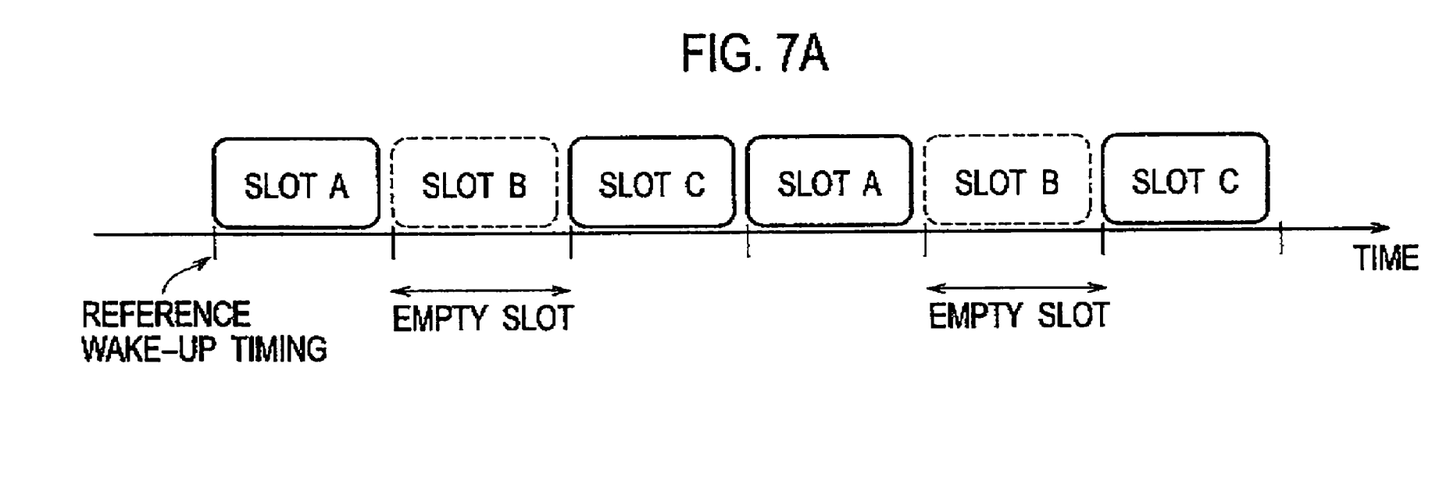
FIGS. 7A and 7B are diagrams illustrating the wake-up timing shift according to the firs embodiment.
Figure 7B:
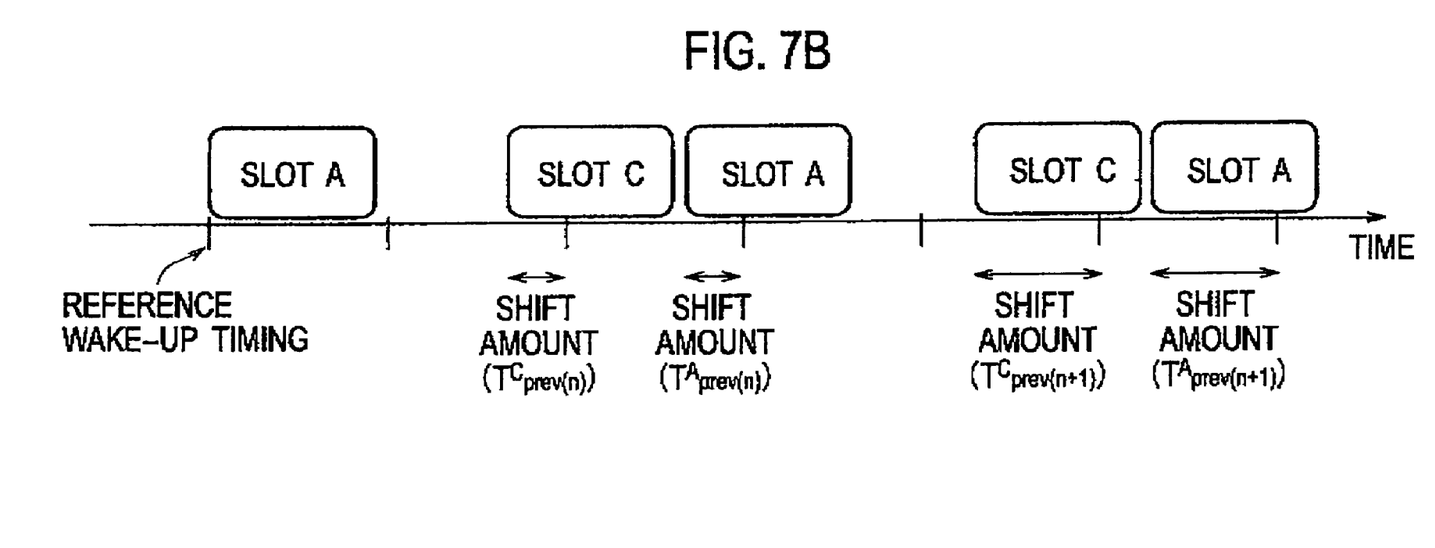

Fourthly, referring to FIGS. 7A and 7B, a description is given as to amounts to shift the wake-up timings of the respective radio terminals 10A and 10C. FIG. 7A is the same as FIG. 4B described above.

As shown in FIG. 7B, the radio terminal 10C makes a time shift of its wake-up timing to before the reference wake-up timing, The radio terminal 10A makes a time shift of its wake-up timing to before the reference wake-up timing. Amounts of the n-th shift for the radio terminals 10A and 10C are "$T^A_{PREV}(n)$" and "$T^C_{PREV}(n)$", respectively. Amounts of the n+1-th shift for the radio terminals 10A and 10C are "$T^A_{PREV}(n+1)$" and "$T^C_{PREV}(n+1)$", respectively. Values of "$T^A_{PREV}(n+1)$" and "$T^C_{PREV}(n+1)$" are larger than those of "$T^A_{PREV}(n)$" and "$T^C_{PREV}(n)$", respectively. For example, as described above, the shift amount when the number of shifts is n+1, namely, the shift amount $T_{PREV}(n+1)$ is calculated by $T_{PREV}(n+1)=C\times T_{PREV}(n)$. Thereby, the period emptied after the radio terminal 10B ends its radio communication shortens with the increase of the number of shifts. Accordingly, an empty period can be effectively used furthermore.

(Configuration of Time Slot)

With reference to the drawings, a description will be given below of the configuration of a time slot according to the first embodiment. FIGS. 8 to 11 are diagrams showing examples of the time slot according to the first embodiment.

Figure 8:
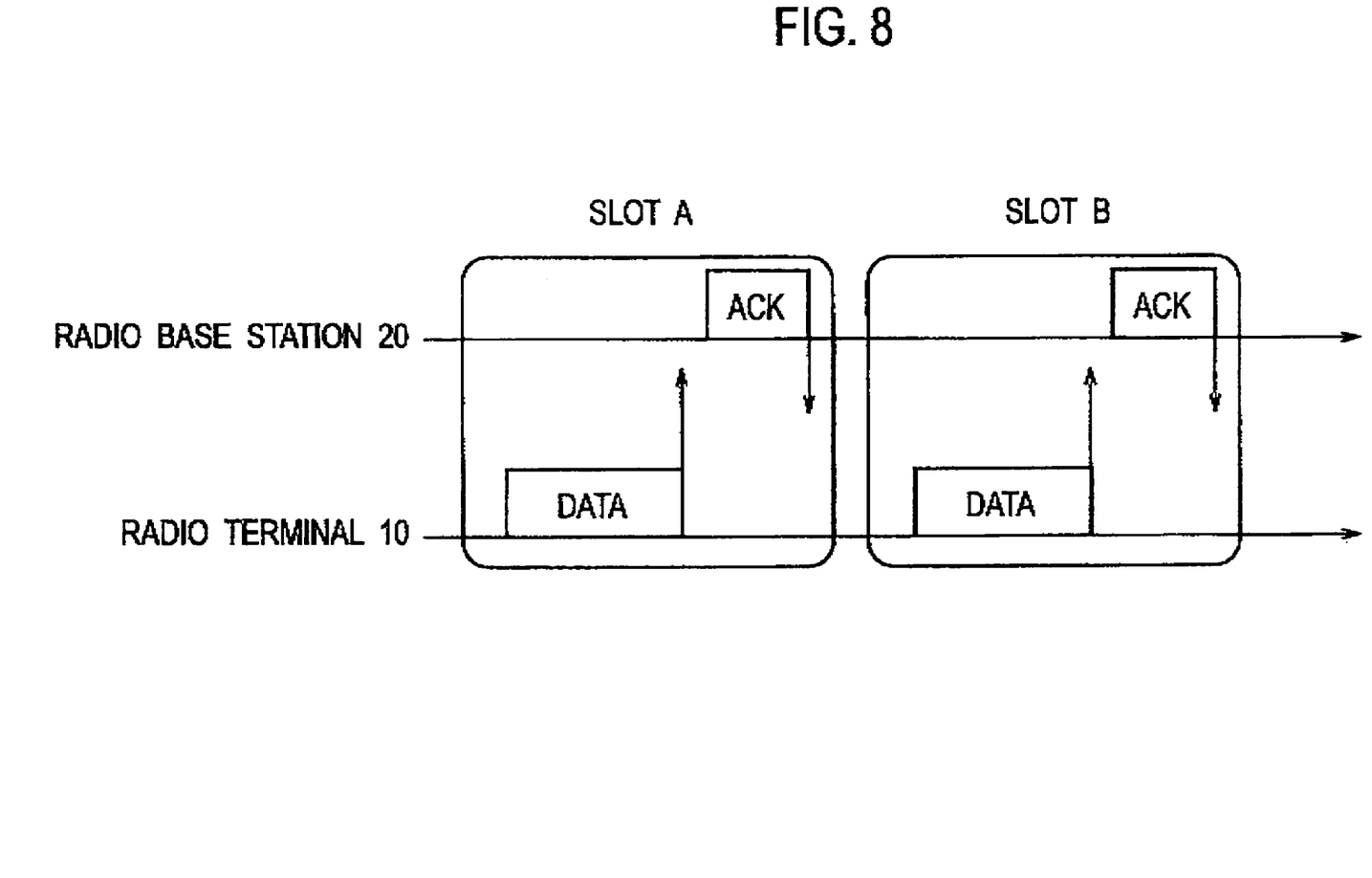
FIG. 8 is a diagram showing a configuration example of a time slot according to the first embodiment.

In the first example shown in FIG. 8, the time slot is configured with user data ("DATA") from the radio terminal 10 to the radio base station 20 and a response ("ACK") to the user data.

Figure 9:
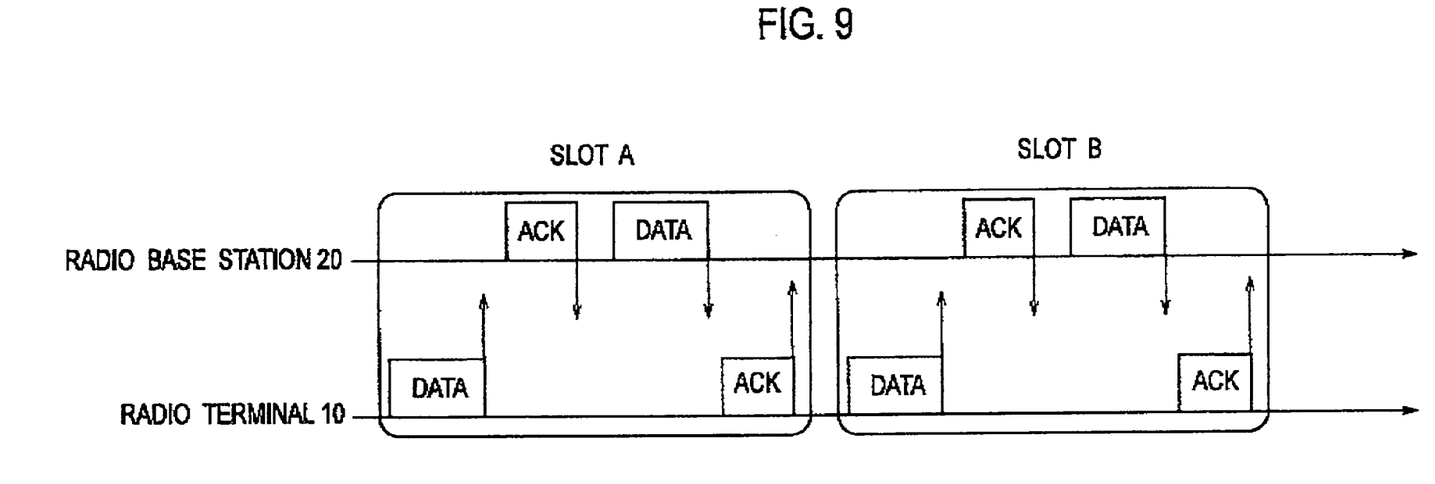
FIG. 9 is a diagram showing a configuration example of the time slot according to the first embodiment.

In the second example shown in FIG. 9, the time slot is configured with, in addition to the configuration shown in FIG. 8, user data ("DATA") from the radio base station 20 to the radio terminal 10 and a response ("ACK") to that user data.

Figure 10:
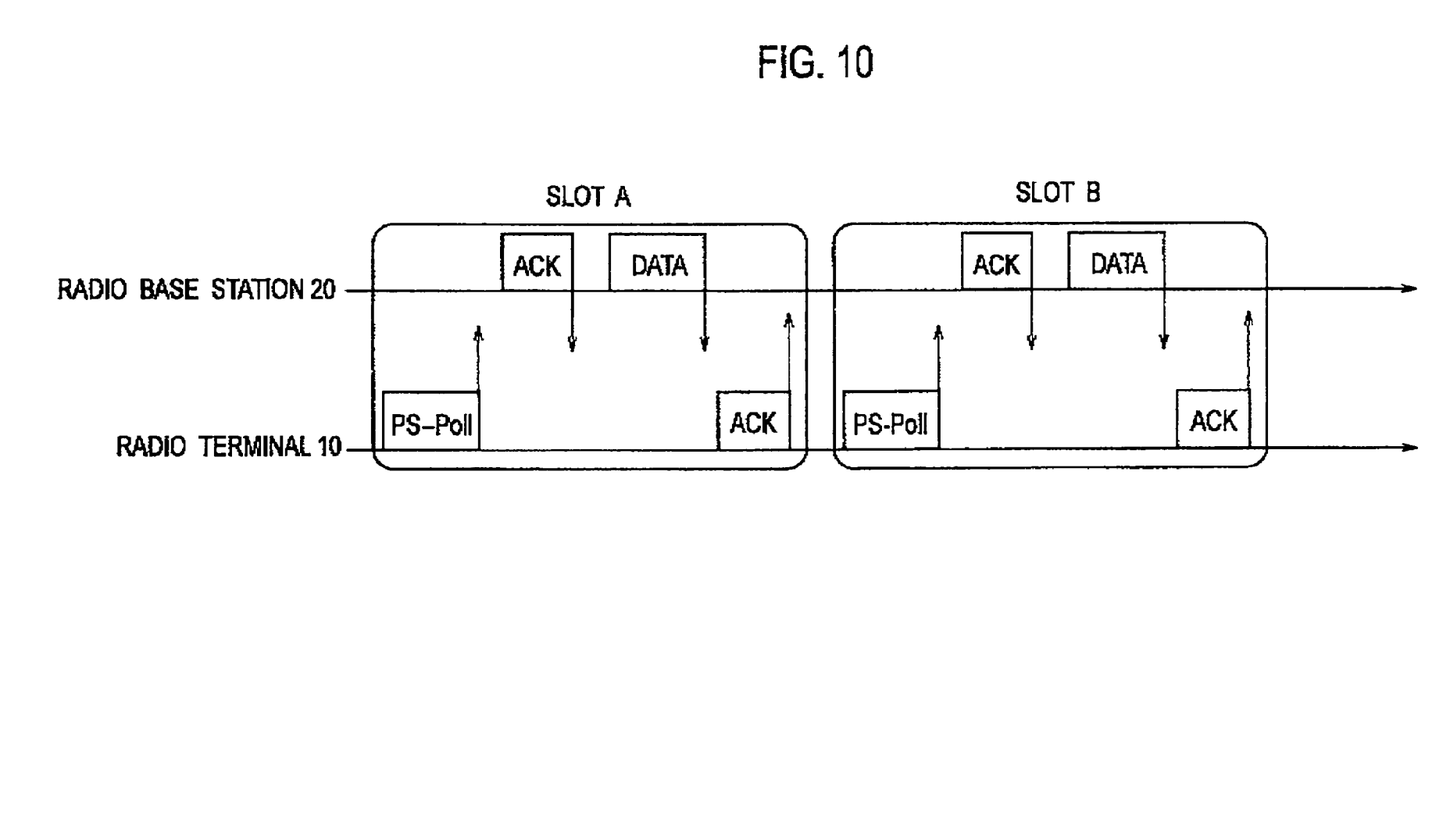
FIG. 10 is a diagram showing a configuration example of the time slot according to the first embodiment.

In the third example shown in FIG. 10, the time slot is configured with polling information ("PS-POLL") from the radio terminal 10 to the radio base station 20, a response ("ACK") to the polling information, user data ("DATA") from the radio base station 20 to the radio terminal 10, and a response ("ACK") to the user data. The polling information is information used by the radio terminal 10 to inquire whether or not the radio base station 20 has acquired any user data to its own radio terminal 10 while the radio terminal 10 is in the sleep state.

Figure 11:
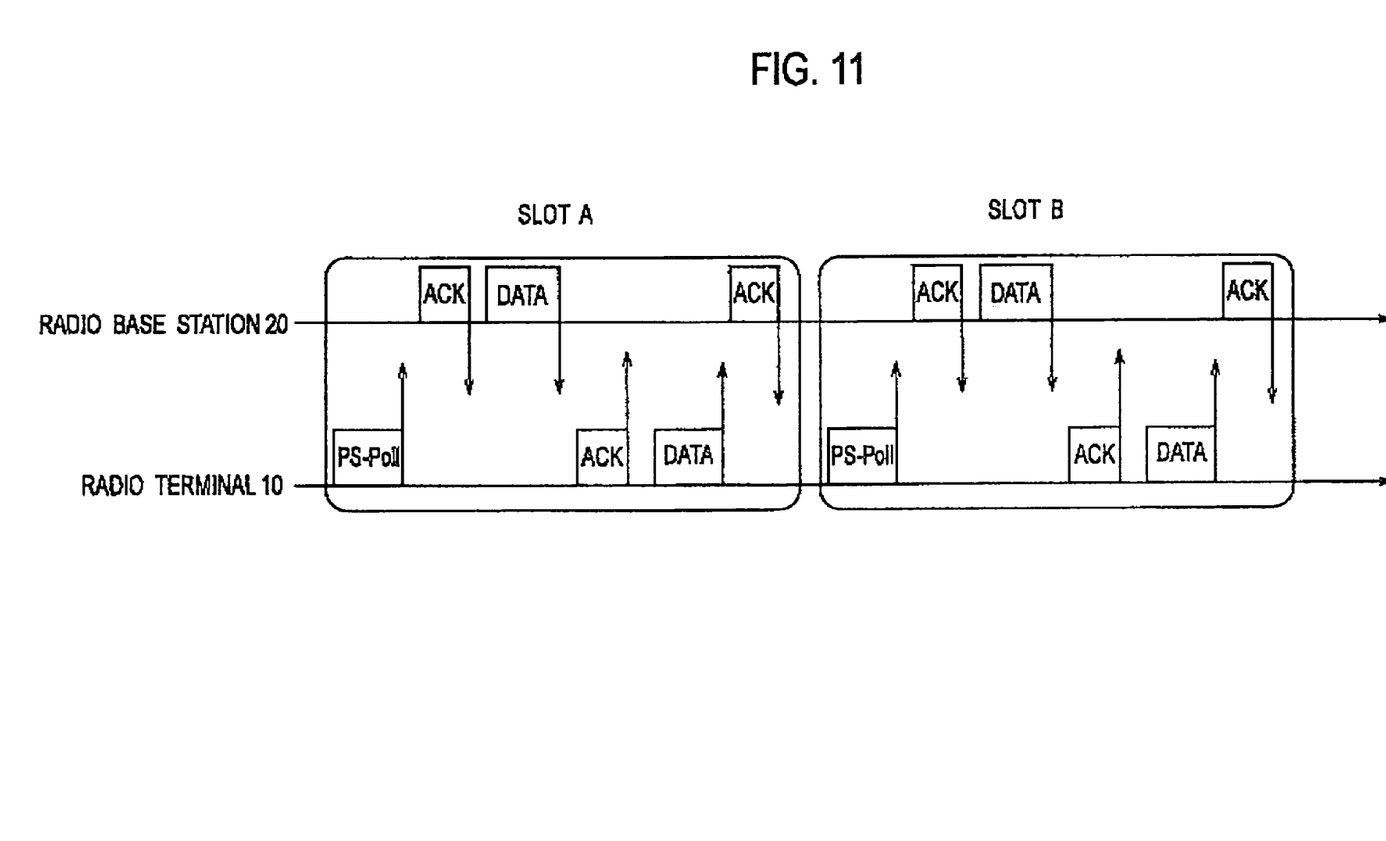
FIG. 11 is a diagram showing a configuration example of the time slot according to the first embodiment.

In the fourth example shown in FIG. 11, the time slot is configured with, in addition to the configuration shown in FIG. 10, user data ("DATA") from the radio terminal 10 to the radio base station 20 and a response ("ACK") to that user data.

ADVANTAGEOUS EFFECTS

In the first embodiment, the controller 16 shifts the wake-up timing from the reference wake-up timing. This means that the period in which the radio terminal 10 is in the wake-up state is shifted from the scheduled timing. Accordingly, a period emptied after a different radio terminal 10 ends its radio communication can be effectively used. Furthermore, since the reference wake-up timing is previously scheduled, wasteful consumption of electric power can be prevented.

In the first embodiment, the controller 16 may shift the wake-up timing from the reference wake-up timing, based on the usage state of the predetermined radio band. This prevents unnecessary shift of the wake-up timing, and thereby also prevents wasteful electric power consumption.

In the first embodiment, the controller 16 may shift the wake-up timing from the reference wake-up timing, based on the QoS information. Thereby, effective use of radio resources and increase of electric power consumed can be balanced according to the radio communication (the application performing the radio communication).

In the first embodiment, the controller 16 may shift the wake-up timing from the reference wake-up timing, based on an error rate of the radio communication performed by its own radio terminal 10 (e.g., packet error rate (PER)). This prevents unnecessary shift of the wake-up timing, and thereby also prevents wasteful electric power consumption.

In the first embodiment, the controller 16 may shift the wake-up timing from the reference wake-up timing, based on the amount of remaining battery accumulated in the battery 12 in its own radio terminal 10. Thereby, effective use of the radio resources and increase of electric power consumed can be balanced.

In the first embodiment, the controller 16 may control the amount by which the wake-up timing is shifted from the reference wake-up timing (shift amount), based on the number for which the wake-up timing has been shifted from the reference wake-up timing (called the number of shifts below). Thereby, a period emptied after a different radio terminal 10 ends its radio communication shortens with the increase of the number of shifts. Accordingly, an empty period can be effectively used furthermore.

In the first embodiment, an upper limit may be defined for the amount by which the wake-up timing is shifted from the reference wake-up timing (shift amount). Thereby, it can be prevented that the wake-up timing shift hinders effective use of the radio resources.

In the first embodiment, the controller 16 may shift the wake-up timing from the reference wake-up timing when a different radio terminal 10 performing radio communication immediately before its own radio terminal 10 has shifted the wake-up timing from the reference wake-up timing. Thereby, a period emptied after the different radio terminal 10 shifts its wake-up timing can be effectively used.

In the first embodiment, when having shifted the wake-up timing from the reference wake-up timing and discovering that the wake-up timing in the predetermined radio band is occupied by a different radio terminal 10, the controller 16 may return the wake-up timing back to the reference wake-up timing. This can prevent unnecessary shift of the wake-up timing from being maintained when there is no empty period.

OTHER EMBODIMENTS

The present invention has been described so far using the embodiment described above. However, it should not be understood that the present invention is limited by the descriptions and drawings that constitute part of this disclosure. This disclosure will make various alternative embodiments, examples, and operational techniques apparent to those skilled in the art.

In the embodiment described above, the radio base station 20 determines the reference timing at which the radio terminal 10 performs radio communication (i.e., reference wake-up timing) for each of the radio terminals 10. Then, each of the radio terminals 10 acquires its reference wake-up timing from the radio base station 20. However, the embodiment is not limited to this.

In Case 1, a representative radio terminal may determine the reference timing at which the radio terminal 10 performs radio communication (i.e., reference wake-up timing) for each of the radio terminals 10. The representative radio terminal 10 is any one of the plurality of radio terminals 10. In such a case, each of the radio terminals 10 not functioning as the representative radio terminal acquires its reference wake-up timings from the representative radio terminal. Note that the radio terminal 10 functioning as the representative radio terminal acquires its reference wake-up timing autonomously within its own radio terminal 10, For example, the radio terminals 10 may acquire reference wake-up timings which are randomly set, or reference wake-up timings which are set according to availability of the predetermined radio band.

In Case 2, each of the radio terminals 10 may autonomously determine the reference timing of its own radio terminal 10 for performing radio communication (i.e., reference wake-up timing). In other words, each of the radio terminals 10 acquires its reference wake-up timing autonomously within its own radio terminal 10.

Note that, in Cases 1 and 2, it is preferable that the reference timing at which the radio terminal 10 performs radio communication (i.e., reference wake-up timing) be determined based on the usage state of the predetermined radio band.

Moreover, in Cases 1 and 2, it is preferable that the reference timing at which the radio terminal 10 performs radio communication (i.e., reference wake-up timing) be determined based on the length of time used by each of the radio terminals 10 to perform radio communication.

What is claimed is:

1. A radio terminal comprising:
a radio interface configured to enable radio communication with a radio base station by using a predetermined radio band;
a controller configured to control switching between a wake-up state in which the radio interface is turned on and a sleep state in which the radio interface is turned off; and
an acquiring unit configured to acquire a reference wake-up timing scheduled as a wake-up timing for switching from the sleep state to the wake-up state, wherein
the controller shifts the wake-up timing from the reference wake-up timing to a different reference wake-up timing, and
the controller shifts the wake-up timing from the different reference wake-up timing back to the reference wake-up timing, when the predetermined radio band at the different wake-up timing is occupied by a different radio terminal.

2. The radio terminal according to claim 1, wherein
the acquiring unit acquires the reference wake-up timing from the radio base station.

3. The radio terminal according to claim 1, wherein
the acquiring unit acquires the reference wake-up timing from another radio terminal.

4. The radio terminal according to claim 1, wherein
the acquiring unit autonomously acquires the reference wake-up timing.

5. The radio terminal according to any one of claims 2 to 4, wherein
the reference wake-up timing is determined based on a usage state of the predetermined radio band.

6. The radio terminal according to any one of claims 2 to 4, wherein
the reference wake-up timing is determined based on a length of time used for radio communication.

7. The radio terminal according to claim 1, further comprising a monitor configured to monitor a usage state of the predetermined radio band in the wake-up state, wherein
the controller shifts the wake-up timing from the reference wake-up timing, based on the usage state of the predetermined radio band.

8. The radio terminal according to claim 1, wherein
the controller shifts the wake-up timing from the reference wake-up timing, based on QoS information set for the radio communication performed by the radio terminal.

9. The radio terminal according to claim 1, wherein
the controller shifts the wake-up timing from the reference wake-up timing, based on an error rate of the radio communication performed by the radio terminal.

10. The radio terminal according to claim 1, further comprising a battery configured to provide electric power to the radio interface, wherein
the controller shifts the wake-up timing from the reference wake-up timing, based on a remaining amount of electric power of the battery.

11. The radio terminal according to any one of claims 8 to 10, wherein
an upper limit is defined for a shift amount by which the wake-up timing is shifted from the reference wake-up timing, and
the controller shifts the wake-up timing from the reference wake-up timing without exceeding the upper limit for the shift amount.

12. The radio terminal according to any one of claims 8 to 10, wherein
the controller shifts the wake-up timing from the reference wake-up timing when a different radio terminal performs radio communication immediately before the radio terminal has shifted the wake-up timing from the reference wake-up timing.

13. The radio terminal according to claim 1, wherein
the controller controls a current shift amount by which the wake-up timing is shifted from the reference wake-up timing in a current shift, and
the controller controls a shift amount of a next shift, based on the current shift amount of the current shift.

14. The radio terminal according to claim 1, wherein
the controller shifts the wake-up timing from the reference wake-up timing to the different reference wake-up timing that identifies an earlier time slot relative to the reference wake-up timing, and
the controller shifts the wake-up timing from the different reference wake-up timing back to the reference wake-up timing, when the earlier time slot is occupied by the different radio terminal.

15. A radio communication system comprising:
a radio base station; and
a plurality of radio terminals each having a radio interface configured to allow radio communication with the radio base station by using a predetermined radio band;
a controller configured to control switching between a wake-up state in which the radio interface is turned on and a sleep-state in which the radio interface is turned off; and
a setter configured to set a reference wake-up timing scheduled as a wake-up timing for switching from the sleep state to the wake-up state, wherein
the controller shifts the wake-up timing from the reference wake-up timing to a different reference wake-up timing, and
the controller shifts the wake-up timing from the different reference wake-up timing back to the reference wake-up timing, when the predetermined radio band at the different wake-up timing is occupied by a different radio terminal.

16. A radio communication method for performing radio communication by using a predetermined radio band in a radio communication system including a radio base station and a plurality of radio terminals each having a radio interface configured to allow radio communication with the radio base station, the radio communication method comprising:
controlling switching between a wake-up state in which the radio interface is turned on and a sleep-state in which the radio interface is turned off;
setting a reference wake-up timing scheduled as a wake-up timing for switching from the sleep state to the wake-up state;
shifting the wake-up timing from the reference wake-up timing to a different reference wake-up timing, and
shifting the wake-up timing from the different reference wake-up timing back to the reference wake-up timing, when the predetermined radio band at the different wake-up timing is occupied by a different radio terminal.

* * * * *